(12) United States Patent
Takahashi et al.

(10) Patent No.: US 7,706,412 B2
(45) Date of Patent: Apr. 27, 2010

(54) DATA PROCESSING APPARATUS AND METHOD, AND DIGITAL BROADCASTING RECEIVER

(75) Inventors: Kazuyuki Takahashi, Chiba (JP); Katsuya Sakai, Saitama (JP)

(73) Assignee: Sony Corporation (JP)

( * ) Notice: Subject to any disclaimer, the term of this patent is extended or adjusted under 35 U.S.C. 154(b) by 698 days.

(21) Appl. No.: 10/509,357

(22) PCT Filed: Jan. 29, 2004

(86) PCT No.: PCT/JP2004/000865

§ 371 (c)(1),
(2), (4) Date: May 16, 2005

(87) PCT Pub. No.: WO2004/068857

PCT Pub. Date: Aug. 12, 2004

(65) Prior Publication Data

US 2005/0229229 A1 Oct. 13, 2005

(30) Foreign Application Priority Data

Jan. 31, 2003 (JP) ............................ P2003-023352

(51) Int. Cl.
*H04L 12/56* (2006.01)
*H04J 1/16* (2006.01)
(52) U.S. Cl. .................... 370/487; 370/419; 370/535
(58) Field of Classification Search ................ 370/487, 370/535, 389, 419, 486; 725/131, 139, 151, 725/68
See application file for complete search history.

(56) References Cited

U.S. PATENT DOCUMENTS

| 6,804,259 | B1 * | 10/2004 | Onagawa ..................... 370/476 |
| 2001/0015986 | A1 * | 8/2001 | Sugimoto et al. ........... 370/487 |
| 2003/0070172 | A1 * | 4/2003 | Matsuzaki et al. ............ 725/87 |
| 2007/0143784 | A1 * | 6/2007 | Kubota et al. .................. 725/31 |

FOREIGN PATENT DOCUMENTS

| JP | 8-265723 A | 10/1996 |
| JP | 8-340541 A | 12/1996 |
| JP | 11-8847 A | 1/1999 |
| JP | 11-289503 A | 10/1999 |
| JP | 2000-101984 A | 4/2000 |
| JP | 2000-295541 A | 10/2000 |
| JP | 2001-285821 A | 10/2001 |
| JP | 2001-352532 A | 12/2001 |
| JP | 2002-369094 A | 12/2002 |

* cited by examiner

*Primary Examiner*—John Pezzlo
(74) *Attorney, Agent, or Firm*—Lerner, David, Littenberg, Krumholz & Mentlik, LLP

(57) ABSTRACT

A necessary packet is extracted from each of a plurality of transport streams, and the extracted packets are reconstructed to one transport stream. Plural packets from the reconstructed one transport stream are descrambled using a conditional access module, and the necessary packets are separated. Each packet separated from the reconstructed one transport stream is decoded. The conditional access module has information needed to descramble the packets from the plurality of transport streams that are in the reconstructed one transport stream.

11 Claims, 12 Drawing Sheets

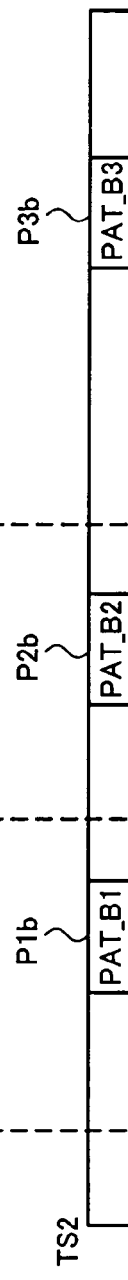
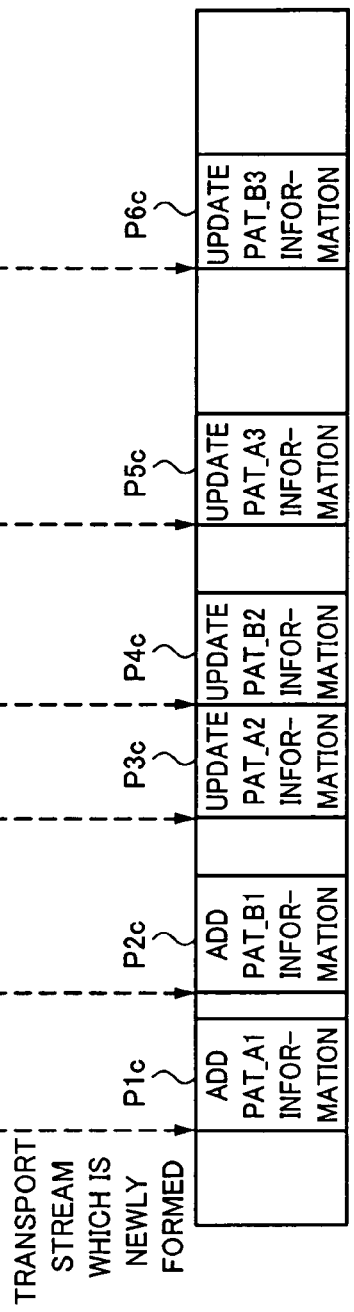
Fig. 10A
Fig. 10B
Fig. 10C

DATA PROCESSING APPARATUS AND METHOD, AND DIGITAL BROADCASTING RECEIVER

CROSS-REFERENCE TO RELATED APPLICATIONS

The present application is a national stage application under 35 U.S.C. §371 of International Application No. PCT/JP2004/000865, filed Jan. 29, 2004, which claims priority from Japanese Application No. P2003-023352, filed Jan. 31, 2003, the disclosures of which are hereby incorporated by reference herein.

BACKGROUND OF THE INVENTION

1. Technical Field

The invention relates to digital processing apparatus and method which are suitable for use in a system which performs broadcasting by a stream of MPEG (Moving Picture Coding Experts Group) 2 like digital satellite broadcasting or digital terrestrial broadcasting. More particularly, the invention relates to such apparatus and method which enable a plurality of simultaneously broadcasted programs to be received without changing a CA (Conditional Access System) system, thereby enabling recording of a back program in the same time slot on a different channel, reproduction of a multi-screen, PinP (Picture in Picture) reproduction, or the like.

2. Background Art

In Japanese digital broadcasting (digital satellite broadcasting, digital terrestrial broadcasting, digital CATV (Cable Television)), an MPEG2 system (ISO/IEC 13818-1 GENERIC CODING OF MOVING PICTURES AND ASSOCIATED AUDIO: SYSTEMS Recommendation H.222.0) is adopted. Such a system has been formed on the basis of the standards of ARIB (Association of Radio Industrial and Businesses).

According to the MPEG2 system, a system for multiplexing individual streams of encoded video/audio, additional data, and the like and reproducing them synchronously with one another has been specified. There are two types of systems such as MPEG2-PS (Program Stream) and MPEG2-TS (Transport Stream).

Since the MPEG2-PS has been made on the assumption that it is applied to transmission and storage of data in an environment where no errors occur and redundancy can be reduced, it is used in a digital storage media such as a DVD (Digital Versatile Disc) or the like using a powerful error correction code.

The MPEG2-TS has been made on the assumption that it is applied to an environment such as broadcasting, communication network, or the like where a transmission error of data occurs, and a plurality of programs can be constructed in one stream. Therefore, the MPEG2-TS is used in digital broadcasting or the like.

In the MPEG2-TS, a plurality of TS (Transport Stream) packets of a fixed length of 188 bytes are collected so as to construct a transport stream. The length of TS packet of 188 bytes has been determined in consideration of matching performance with a length of ATM (A synchronous Transfer Mode) cell.

The TS packet is constructed by a packet header of a fixed length of 4 bytes and an adaptation field and a payload of a variable length. A PID (packet identifier) and various flags have been defined in the packet header. The type of TS packet is identified by the PID.

A PES (Packetized Elementary Stream) packet in which the individual streams of video, audio, and the like have been enclosed is divided into a plurality of TS packets having the same PID numbers and transmitted. For example, the MPEG2 system is used for encoding the video data. An MPEG2-AAC (MPEG2 Advanced Audio Coding) system is used for encoding the audio data in, for example, BS (Broadcast Satellite) digital broadcasting.

The PES packet in which data such as subtitles and the like has been enclosed is also divided into a plurality of TS packets and transmitted in a manner similar to the packet of video and audio.

Further, a packet of information of SI (Service Information) described by a table in a section format is contained in the transport stream. There is PSI (Program Specific Information) as SI for all stations. The PSI is information necessary for a system which selects and receives a program of a desired broadcast. As such information, there are a PAT (Program Association Table), a PMT (Program Map Table), an NIT (Network Information Table), a CAT (Condition Access Table), and the like.

A PID and the like of the PMT corresponding to the program number have been described in the PAT. Video data, audio data, and additional data included in the corresponding program, and the PID of a PCR are described in the PMT. A carrier frequency at which a target program is transmitted has been described in the NIT. Information regarding identification of a limited receiving system and information regarding individual information such as contract information or the like are described in the CAT. There is an EIT (Event Information Table) as SI which is used for services of a broadcasting company. A broadcasting schedule of programs has been described in the EIT. The EIT is used for an EPG (Electronic Program Guide) or recording reservation.

As digital broadcasting of such an MPEG2 system, digital CS (Communication Satellite) broadcasting and digital BS (Broadcast Satellite) broadcasting have already been started. In the digital BS broadcasting, broadcasting of an HDTV (High Definition Television) has been performed in addition to an ordinary SDTV (Standard Definition Television). Execution of the digital terrestrial broadcasting is also being examined.

In such an MPEG2 system, the CAT system is adopted as a process for limited reception. Keys for the limited reception have a triple-layer structure comprising a master key, a work key, and a scramble key. The work key is updated in a relatively long period, encrypted by the master key, and transmitted in the section format as an EMM (Entitlement Management Message) packet. Encrypted personal contract contents have been described in the EMM. Scramble key information is encrypted in a relatively short period and transmitted in the section format as an ECM (Encryption Control Message) packet. The PID with which the EMM is transmitted is designated by a limited reception descriptor in the CAT (Condition Access Table). The PID with which the ECM is transmitted is designated by a limited reception descriptor in the PMT.

In the receiver, the CAT is received. By receiving the CAT, the PID of the EMM is notified. The EMM for the user himself which coincides with the individual ID (card ID) in an IC card is then received. Information of this EMM is sent to the IC card and contract contents are stored in the IC card.

When a desired program is received, the NIT is obtained, a channel list is searched from the NIT, and a carrier frequency at which a desired program is being broadcasted is obtained. When the carrier frequency of the desired program is obtained, a receiving frequency is set into the carrier frequency at which the desired program is being broadcasted.

The PAT is obtained at the carrier frequency. Program information in each carrier and the PID of the PMT showing the contents in each program have been described in the PAT. The PID in which the PMT of the desired program has been described is obtained from the PAT. Components (video/audio) of the desired program and the PID of the ECM necessary for descrambling are obtained from the PMT.

To descramble the scrambling, the packet of the ECM is received and information of the ECM is sent to the IC card. Only when the decryption is permitted on the basis of the contract contents stored in the IC card, a decrypt key is returned from the IC card. The decrypt key and the PID of the components to be descrambled are set into a descrambler. The packet of each component of the desired program is descrambled by a descramble key.

The descrambled packet of each component is sent to a demultiplexer. The video PES packet and the audio PES packet for receiving the desired program are separated by the demultiplexer. The video PES packet and the audio PES packet are then decoded.

The CA system of the MPEG2 has been described in the following patent literature (JP-A-8-265723).

As mentioned above, in the MPEG2 system, the limited reception by the CAT is performed. The limited reception by the CAT is performed on the assumption that one program is monitored by one receiving system. Therefore, to simultaneously monitor and record a plurality of programs, a plurality of receivers and a plurality of CA systems which are necessary for monitoring them are needed.

For example, upon recording of what is called a back program (program in the same time slot on a different channel), a program which is being simultaneously broadcasted by another program is recorded while the user is watching a certain program. In such back program recording, it is necessary to simultaneously receive a plurality of programs. In the case of processing in such a manner that display screens of two reception programs are simultaneously displayed onto one display screen like "PinP", it is necessary to simultaneously receive a plurality of programs.

In the limited reception by the CAT of the conventional MPEG2 system, when a plurality of programs are simultaneously received as mentioned above, it is necessary to make a plurality of monitor contracts. However, it is not practical to make a plurality of monitor contracts in order to simultaneously receive a plurality of programs.

SUMMARY OF THE INVENTION

It is an object of the invention to provide data processing apparatus and method which can cope with a construction in which programs according to a plurality of transport streams can be simultaneously received without changing a CA system.

According to the invention, there is provided a data processing apparatus comprising: means for extracting a necessary packet from each of a plurality of transport streams and reconstructing the extracted packets to one transport stream; means for executing limited reception from the reconstructed one transport stream and separating the necessary packets; and means for decoding each packet separated from the reconstructed one transport stream.

According to the invention, there is provided a data processing apparatus comprising: means for extracting information of a packet of SI (Service Information) from each of a plurality of transport streams and executing a process for limited reception by using the information of the packet of the SI obtained from each of the plurality of transport streams; means for executing the common limited reception with respect to each of the plurality of transport streams and separating the necessary packets; and means for decoding each packet separated from each of the transport streams.

According to the invention, there is provided a digital broadcasting receiver comprising: means for extracting a necessary packet from each of a plurality of transport streams and reconstructing the extracted packets to one transport stream; means for executing limited reception from the reconstructed one transport stream and separating the necessary packets; and means for decoding each packet separated from the reconstructed one transport stream.

According to the invention, there is provided a data processing method comprising the steps of: extracting a necessary packet from each of a plurality of transport streams and reconstructing the extracted packets to one transport stream; executing limited reception from the reconstructed one transport stream and separating the necessary packets; and decoding each packet separated from the reconstructed one transport stream.

According to the invention, there is provided a data processing method comprising the steps of: extracting packet information of SI (Service Information) from each of a plurality of transport streams and executing a process for common limited reception by using the information of the packet of the SI obtained from each of the plurality of transport streams; executing the limited reception with respect to each of the plurality of transport streams and separating the necessary packets; and decoding each packet separated from each of the transport streams, respectively.

The necessary packet is extracted from each of the plurality of transport streams, one transport stream is reconstructed, the limited reception is executed from the reconstructed one transport stream, the necessary packets are separated, and each packet separated from the reconstructed one transport stream is decoded, respectively.

That is, the packet information of the SI is extracted from each of the plurality of transport streams, one transport stream is reconstructed from the plurality of transport streams, and the new packet of the SI is reconstructed from the information of the SI packet obtained from each of the plurality of transport streams.

The packet information of the SI is extracted from each of the plurality of transport streams, one transport stream is reconstructed from the plurality of transport streams, the information of the SI packet obtained from each of the plurality of transport streams is sent to a microprocessor, and the process for the limited reception is executed.

The packet information of the SI is extracted from each of the plurality of transport streams and sent to the microprocessor, the limited reception is executed in a common limited receiving system by using the information of the SI packet obtained from each of the plurality of transport streams, the necessary packets are separated, and each of the packets separated from the plurality of transport streams is decoded, respectively.

Thus, the programs of a plurality of transport streams can be simultaneously reproduced without changing the CA system. Therefore, the back program recording, multiscreen reproduction, PinP reproduction, or the like can be executed.

BRIEF DESCRIPTION OF THE DRAWINGS

FIG. 10 is a schematic diagram for use in explanation of reconstruction of SI.

DETAILED DESCRIPTION

Figure 1:
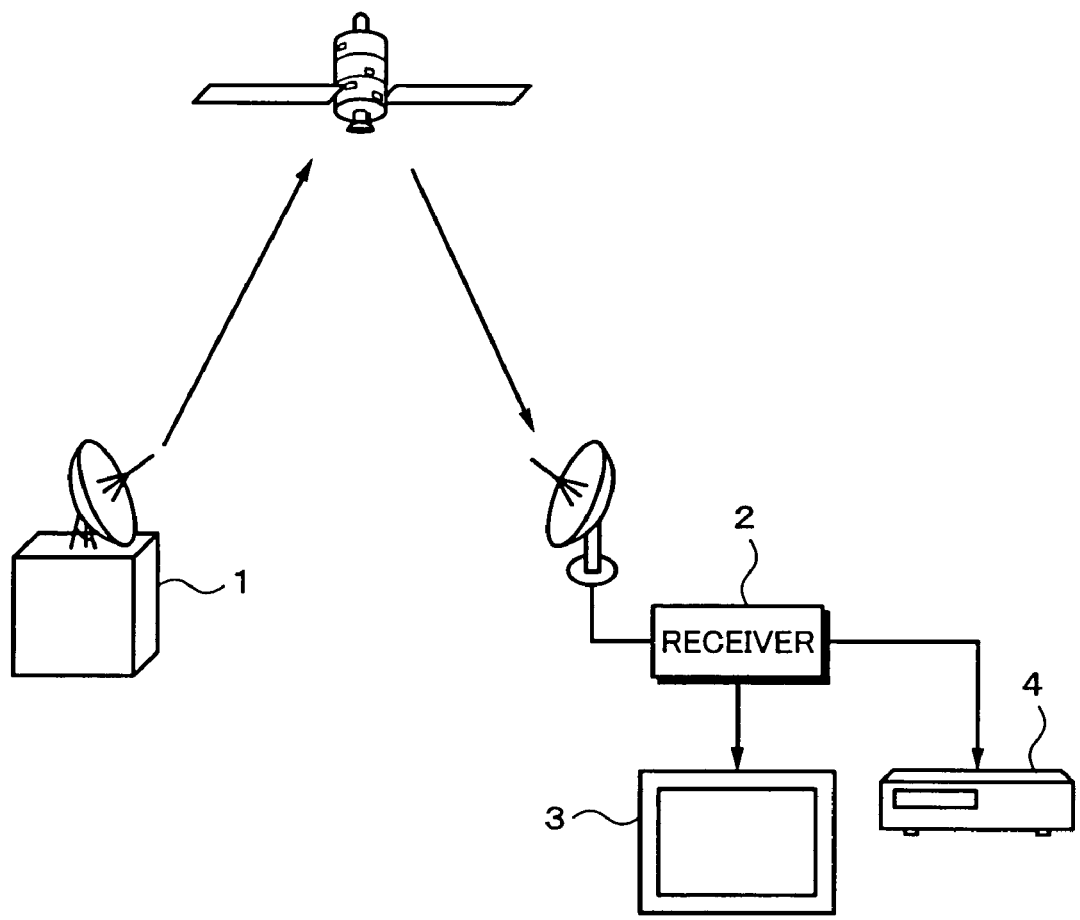
FIG. 1 is a block diagram of an example of a broadcasting system to which the invention is applied.

Embodiments of the invention will now be described hereinbelow with reference to the drawings. FIG. 1 shows an outline of a receiving system to which the invention is applied.

In FIG. 1, a signal of digital broadcasting is transmitted from a broadcasting station 1. The digital broadcasting signal is used to broadcast a video image, an audio sound, and data by the system of the MPEG2-TS. As digital broadcasting, there are digital satellite broadcasting, digital terrestrial broadcasting, digital CATV, and the like. The invention can be applied to a case of any broadcasting format so long as the digital broadcasting is executed by the system of the MPEG2-TS.

Figures 2A, 2B:
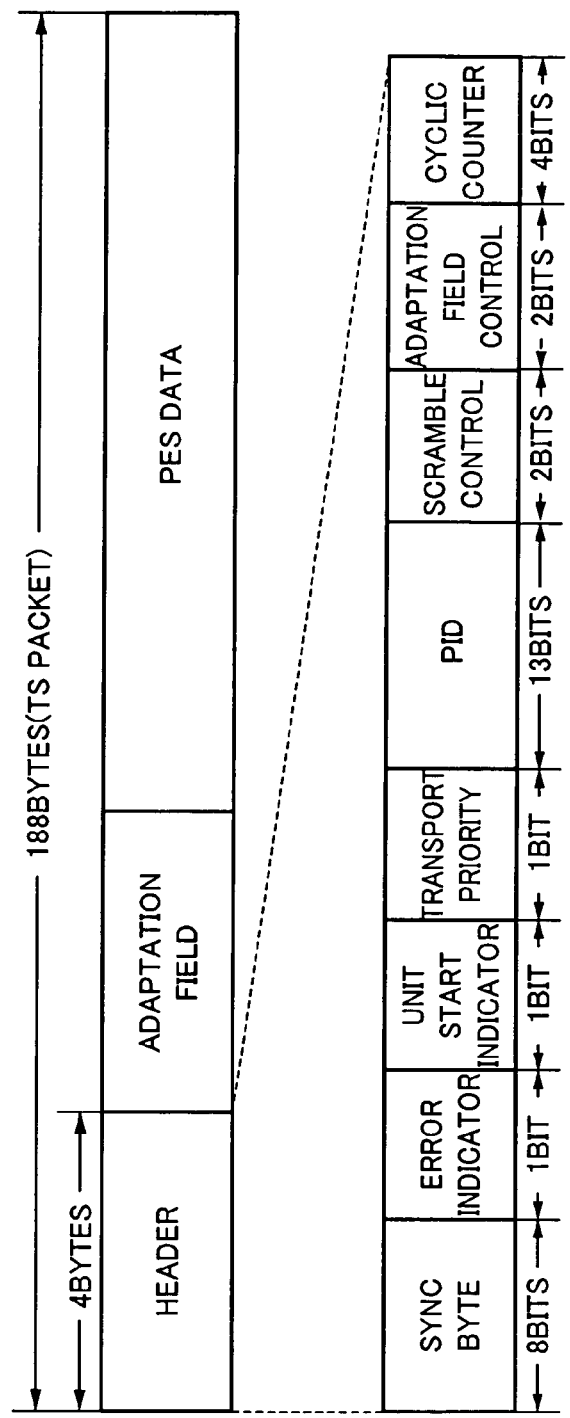
FIG. 2 is a schematic diagram for use in explanation of a TS packet of MPEG2-TS.

In the MPEG2-TS, a TS packet comprising 188 bytes is used as shown in FIG. 2A. This TS packet comprises a header of 4 bytes and a payload of 184 bytes.

A sync byte of 8 bits showing a head of the packet is provided for a head of the header as shown in FIG. 2B. Subsequently, the head comprises: an error indicator of 1 bit showing the presence or absence of an error in the packet; a unit start indicator of 1 bit showing that a new PES packet starts from the payload of this transport packet; a transport priority of 1 bit showing significance of this packet; a PID (packet_ID) of 13 bits for identifying the individual packet; a scramble control of 2 bits showing the presence or absence of scramble of the payload; an adaptation field control of 2 bits showing the presence or absence of an adaptation field and the presence or absence of the payload; and a cyclic counter of 4 bits for detecting whether a part of the packet having the PID has been abandoned halfway or not on the basis of continuity of a reception count.

The adaptation field is provided for transmitting additional information regarding the individual streams. The adaptation field comprises: an adaptation field length; a discontinuity display; a random access display; a stream priority display; a flag for an optional field; the optional field; and a stuffing byte.

In addition to the packet of the video, audio, and data such as subtitles and the like, the packet of the SI of the information described by the table in the section format of the PSI or SI is included in the transport stream.

The PSI is information necessary for the system in order to select and receive the program of a desired broadcast, or the like.

The NIT (Network Information Table), the PAT (Program Association Table), the PMT (Program Map Table), the CAT (Condition Access Table), and the like exist as PSI.

In the NIT, the same content shave been multiplexed to all carriers and transmission specifications (a plane of polarization, a carrier frequency, a convolution rate, etc.) of each carrier and a list of programs multiplexed there have been described. The PID of the packet in the section of the NIT is set to (PID=0x0010).

Information of the contents which are peculiar to each carrier has been described in the PAT. Program information in each carrier and the PID of the PMT showing the contents of each program have been described. The PID of the packet in the section of the PAT is equal to (PID=0x0000).

Components constructing each program and the PID of the ECM packet necessary for descrambling have been described in the PMT (Program Map Table). The PID of the packet in the section of the PMT is designated by the PAT.

The PID of the packet of the EMM has been described in the CAT (Condition Access Table). The PID of the packet of the section of the CAT is set to (PID=0x0001).

The EIT (Event Information Table) exists as SI which is used for broadcasting services. The broadcasting schedule of the programs has been described in the EIT. The EIT is used for the EPG (Electronic Program Guide) or the recording reservation. The PID of the packet of the section of the EIT is set to (PID=0x0012).

The signal transmitted from the broadcasting station 1 in FIG. 1 is received by a receiver 2 in each home. The TS packet is demodulated from the reception signal by the receiver 2 in each home. A video PES packet and an audio PES packet are extracted from the TS packet. A video signal and an audio signal are decoded from the video PES packet and the audio PES packet. A data packet is extracted from the reception signal and the data packet is decoded.

As will be explained hereinafter, in the receiver 2 to which the invention is applied, the packets necessary for monitoring are extracted from a plurality of transport streams and can be reconstructed and transmitted as one transport stream to the CA system. Thus, a plurality of programs which are simultaneously broadcasted can be reproduced.

The video signal and audio signal which were decoded by the receiver 2 are supplied to a television receiver 3 as a monitor. In the television receiver 3, a display screen based on the video signal is reproduced and its reproduction sound is outputted. At the same time, a video signal and an audio signal of another program are decoded by the receiver 2. The video signal and audio signal of such another program are supplied to a recording/reproducing apparatus 4. In the recording/reproducing apparatus 4, the video signal and audio signal of such another program are recorded.

As mentioned above, in the receiver 2 to which the invention is applied, the packets necessary for monitoring are extracted from a plurality of transport streams, reconstructed, and transmitted as one transport stream to the CA system, so that a plurality of programs which are simultaneously broadcasted can be reproduced. Thus, what is called back program recording in which while the user is watching the program of one program, the program of another program is recorded can be realized.

Figure 3B:
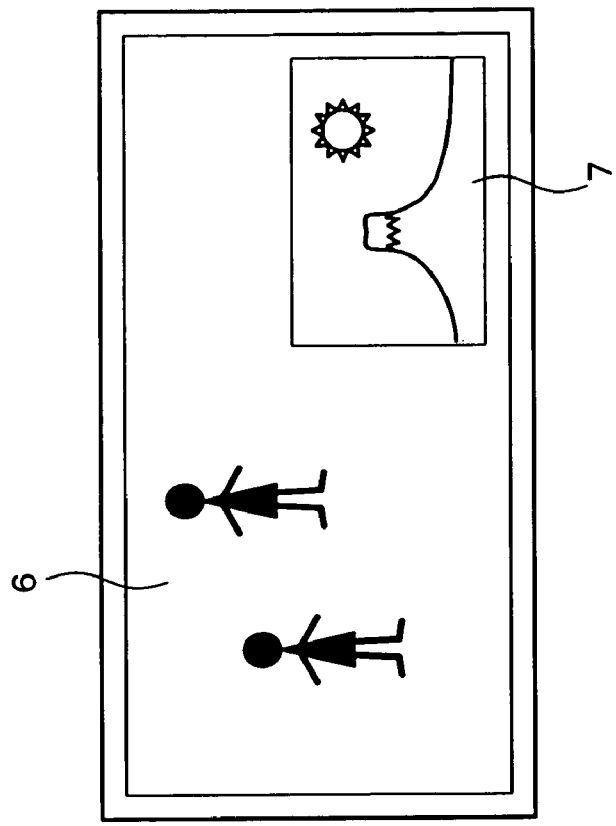
FIG. 3 is a schematic diagram for use in explanation of multiscreen reproduction and PinP reproduction.
Figure 3A:
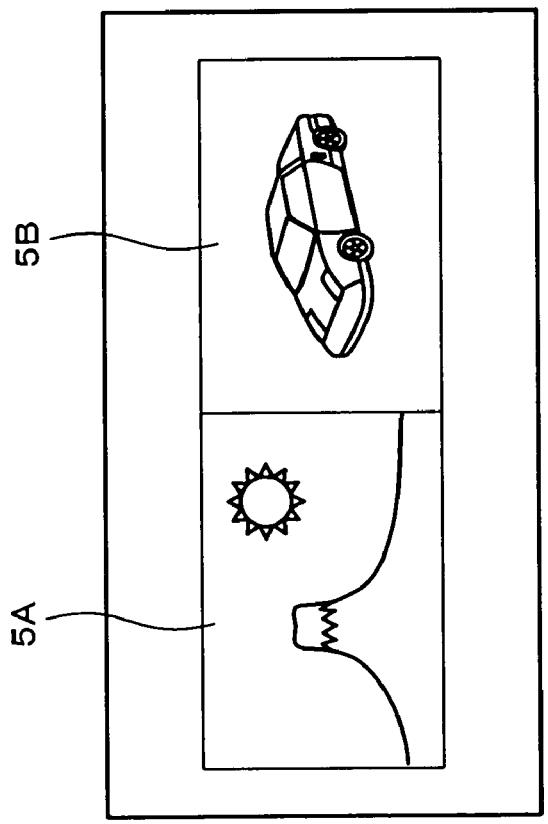

It is possible to realize such an operation that display screens 5A and 5B of programs of two different programs are displayed onto one display screen (multiscreen reproduction) as shown in FIG. 3A, or a child display screen 7 is provided in a parent display screen 6 and a video image of a program different from that of the parent display screen 6 is displayed onto the child display screen 7 (PinP reproduction) as shown in FIG. 3B.

Figure 4:
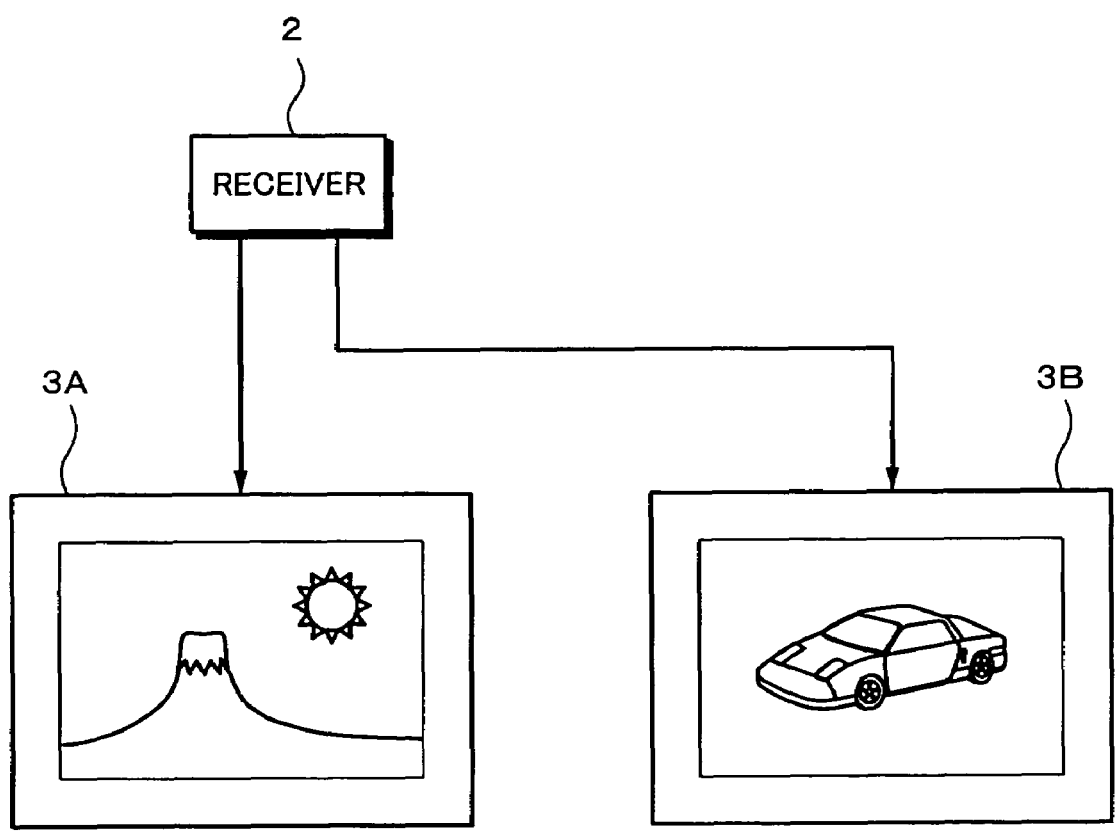
FIG. 4 is a schematic diagram for use in explanation of reproduction according to a plurality of receivers.

If two television receivers 3A and 3B are coupled with the receiver 2 as shown in FIG. 4, video images of different programs can be displayed onto the television receivers 3A and 3B, respectively.

As mentioned above, in the receiver 2 to which the invention is applied, the packets necessary for monitoring are extracted from a plurality of transport streams, reconstructed, and transmitted as one transport stream to the CA system, so that a plurality of programs which are simultaneously broadcasted can be reproduced. A specific construction of such a receiver 2 will be described hereinbelow.

Figure 5:
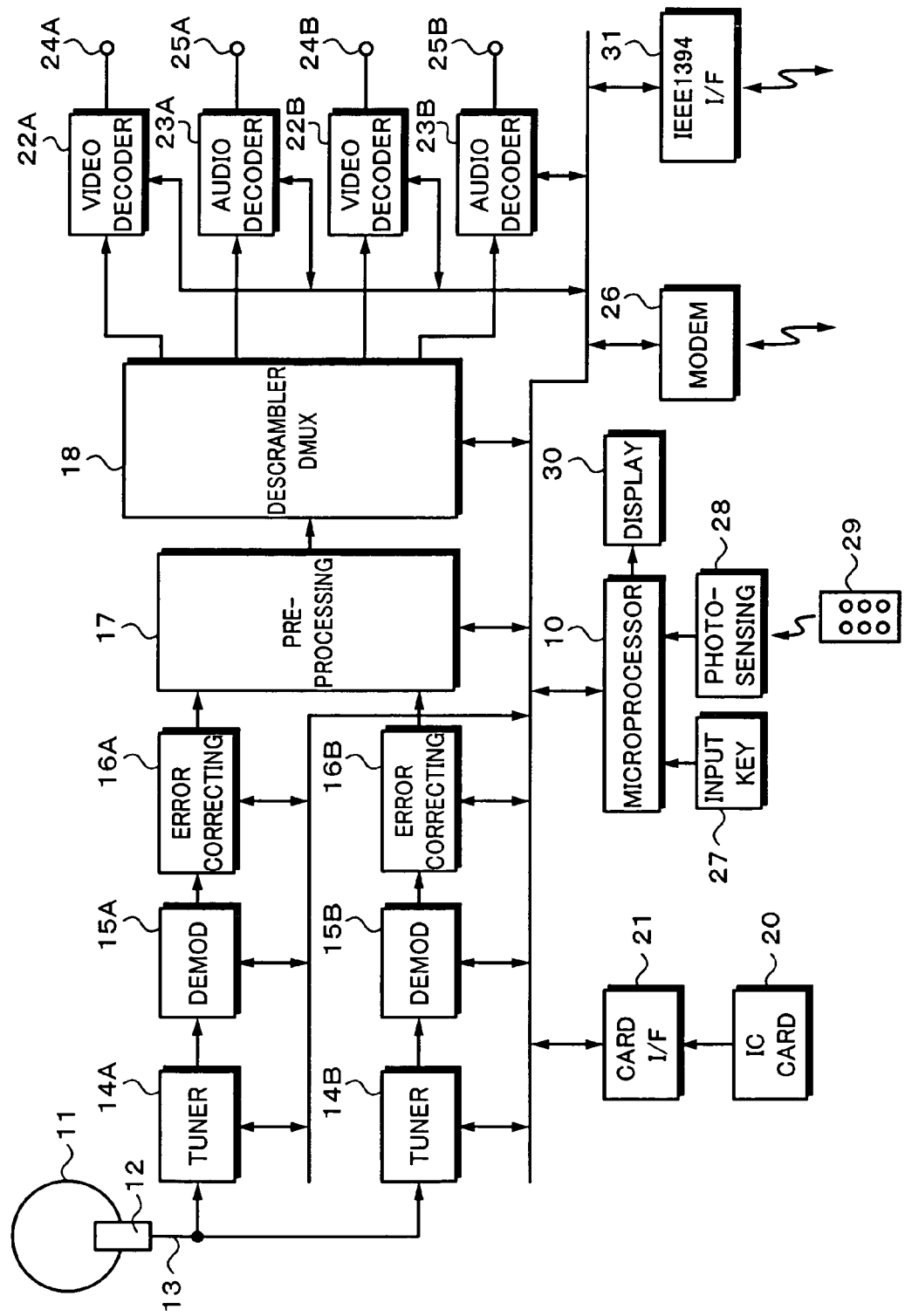
FIG. 5 is a block diagram of an example of the receiver to which the invention is applied.

FIG. 5 shows the specific construction of the receiver to which the invention can be applied. This example relates to the case where the digital BS broadcasting is received.

In FIG. 5, a radio wave of digital satellite broadcasting sent through a satellite by a radio wave of a band of, for example, 12 GHz is received by a parabolic antenna 11. It is converted into a first intermediate frequency signal of a band of, for example, 1 GHz by an LNB (Low Noise Block Down Converter) 12 attached to the parabolic antenna 11. An output of the LNB 12 is supplied to tuner circuits 14A and 14B through a cable 13.

Station selection signals are supplied from a microprocessor 10 to the tuner circuits 14A and 14B, respectively. On the basis of the station selection signals from the microprocessor 10, signals of desired carrier frequencies are selected from the reception signals by the tuner circuits 14A and 14B.

Outputs of the tuner circuits 14A and 14B are supplied to demodulating circuits 15A and 15B. In the demodulating circuits 15A and 15B, demodulating processes of BPSK (Binary Phase Shift Keying), QPSK (Quadrature Phase Shift Keying), and 8PSK (8-phase PSK) can be executed, respectively.

That is, in the digital BS broadcasting, layered transmission is executed by the BPSK, QPSK, and 8PSK. In the 8PSK modulation, although an information amount per symbol increases, if there is attenuation due to rainfall, an error rate deteriorates. On the other hand, in the BPSK or QPSK, although an information amount per symbol decreases, even if there is attenuation due to rainfall, the error rate hardly deteriorates.

On the transmission side, one TS packet is made to correspond to one slot and each TS packet is mapped to a frame constructed by 48 slots. The modulating system and the encoding system can be allocated every slot. A type of modulating system and an encoding ratio which were allocated to each slot are transmitted by a TMCC (Transmission and Multiplexing Configuration Control) signal. A super frame is constructed on a unit basis of 8 frames and interleaving is executed every position of the slot.

Outputs of the demodulating circuits 15A and 15B are supplied to error correcting circuits 16A and 16B. An error correcting process is executed in the error correcting circuits 16A and 16B.

That is, in the digital BS broadcasting, as an error correction encoding system, a Reed Solomon code (204, 188) is used as an outer code and a trellis code or a convolution code is used as an inner code. In the error correcting circuits 16A and 16B, an error correcting process of the inner code is executed by Viterbi decoding and an error correcting process of the outer code is executed by the Reed Solomon code.

Two transport streams are outputted from the error correcting circuits 16A and 16B. An output of the error correcting circuit 16A and an output of the error correcting circuit 16B are supplied to a preprocessing circuit 17.

The preprocessing circuit 17 extracts the packets necessary for monitoring from the two transport streams from the error correcting circuits 16A and 16B, respectively, reconstructs them, and outputs one transport stream.

An output of the preprocessing circuit 17 is supplied to a descrambler & demultiplexer 18. CAS control is made in the descrambler & demultiplexer 18.

That is, in the case of the limited reception, the transport stream has been encrypted. Personal information has been stored in an IC card 20. The IC card 20 is attached through a card interface 21.

To execute the limited reception, the packet of the CAT is received. By receiving the packet of the CAT, the PID of the packet of the EMM is notified. The packet of the EMM which has been addressed to the user himself and coincides with the individual ID (card ID) in the IC card 20 is received. The information of the EMM is sent to the IC card 20 and contract contents are stored into the IC card 20.

The two transport streams are synthesized to one transport stream by the preprocessing circuit 17. At this time, the packets of SI such as NIT, PAT, PMT, or the like are reconstructed so as not to collapse. When a desired program is received, a program list is searched from the packet of the NIT and the receiving frequencies of the tuner circuits 14A and 14B are set on the basis of the program list. The packet of the PAT is obtained. Program information in the carrier and the PID of the PMT showing the contents of each program have been described in the packet of the PAT. Components (video/audio) constructing each channel and the PID of the ECM packet necessary for descrambling have been described in the PMT.

The packet of the PMT of the desired program is received on the basis of the PAT. Components (video/audio) of the desired program and the PID of the ECM packet are obtained from the packet of the PMT. To descramble the scrambling, the packet of the ECM is received and this ECM packet is sent to the IC card 20.

For example, in the case of simultaneously receiving two programs, the packet of the PMT of each program is received and components (video/audio) of each program and the PID of the ECM packet are obtained. Each ECM packet is received and sent to the IC card 20. Only when the decryption is permitted on the basis of the contract contents stored in the IC card, a decrypt key is returned from the IC card 20. For example, in the case of simultaneously receiving two programs, whether the decryption has been permitted or not is discriminated with respect to each program. If the decryption is permitted, the decrypt key of each program is returned. The packet of each component of the desired program is descrambled by the descramble key.

The descrambled packet of each component is sent to the demultiplexer. The video PES packet and the audio PES packet for receiving the desired program are separated by the demultiplexer. For example, in the case of simultaneously receiving two programs, the video PES packet and the audio PES packet for receiving each program are separated.

In the case of simultaneously receiving two programs, the video PES packet of one program is sent to a video decoder 22A and the audio PES packet is sent to an audio decoder 23A. The video PES packet of the other program is sent to a video decoder 22B and the audio PES packet is sent to an audio decoder 23B.

The video decoders 22A and 22B receive the video PES packet from the descrambler & demultiplexer 18 and execute a decoding process of the MPEG2 system, thereby reproducing the video signal. The audio decoders 23A and 23B receive the audio PES packet from the descrambler & demultiplexer 18 and execute a decoding process of the MPEG2-AAC (MPEG2 Advanced Audio Coding), thereby forming the audio signal.

In the case of simultaneously receiving the two programs, the reproduction video signal of one program is outputted from an output terminal 24A and the reproduction audio signal of one program is outputted from an output terminal 25A. The reproduction video signal of the other program is outputted from an output terminal 24B and the reproduction audio signal of the other program is outputted from an output terminal 25B.

A modem 26 is also provided. Charge information is sent to the broadcasting center of the program by a telephone line through the modem 26.

An operation input is given by an input key 27. The input key 27 comprises, for example, various keys and switches which are arranged on a panel of the receiver. The operation can be inputted by an infrared remote controller 29. A photosensing unit 28 for receiving an infrared command signal from the infrared remote controller 29 is provided. A signal from the photosensing unit 28 is sent to the microprocessor 10.

Various setting states are displayed on a display unit 30. The display unit 30 comprises, for example, a liquid crystal display or an LED (Light Emitting Diode) device arranged on the panel.

An IEEE (Institute of Electrical and Electronics Engineers) 1394 interface 31 for inputting and outputting data is provided for the receiver. The received transport stream can be outputted through the IEEE1394 I/F 31. A transport stream transferred from another apparatus can be also inputted through the IEEE1394 I/F 31.

Although the example of the receiver of the digital BS broadcasting has been described here, a fundamental construction of the receiver of the digital terrestrial broadcasting or digital CATV is similar to that of the digital BS broadcasting except that its modulating system and error correcting system differ from those of the receiver of the digital BS broadcasting. In the case of the digital terrestrial broadcasting, an OFDM (Orthogonal Frequency Division Multiplex) is used as a modulating system. In the digital CATV, a multivalue QAM (Quadrature Amplitude Modulation) is used as a modulating system.

As mentioned above, the preprocessing circuit 17 for extracting the packets necessary for respectively monitoring from the two transport streams from the error correcting circuits 16A and 16B, reconstructing them, and outputting one transport stream is provided for the receiver to which the invention is applied. By the preprocessing circuit 17, a plurality of transport streams can be reconstructed as one transport stream and processed by one CA system. Thus, a plurality of programs can be simultaneously received and the back program recording, multiprogram display, PinP display, or the like can be performed.

Figure 6:
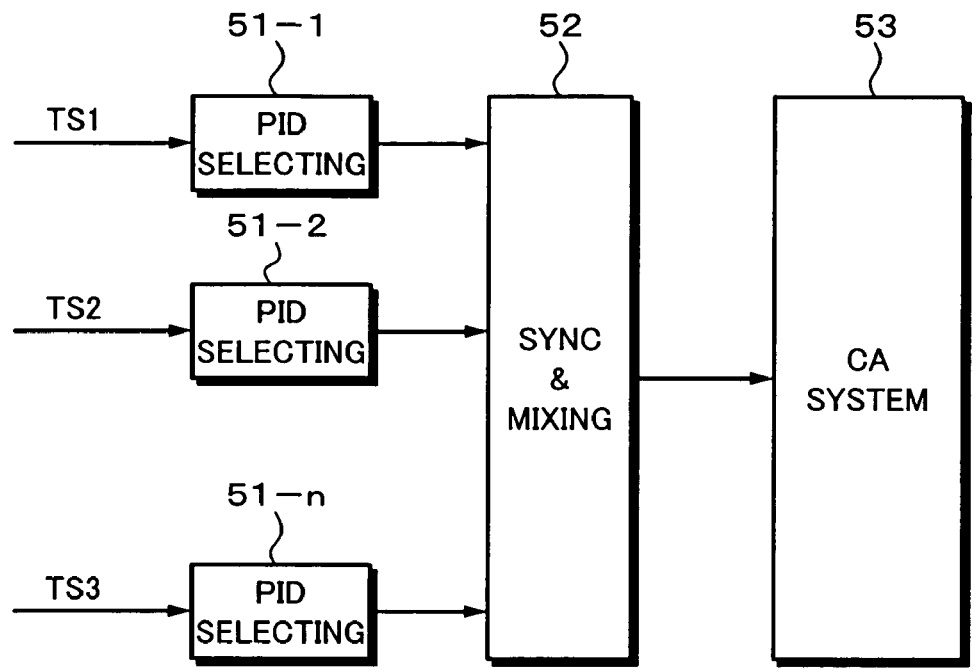
FIG. 6 is a block diagram of an example of a preprocessing circuit.

FIG. 6 shows an example of the preprocessing circuit 17 mentioned above. As a preprocessing circuit 17, a circuit for reconstructing a plurality of transport streams into one transport stream is shown. In the example of FIG. 5, the preprocessing circuit 17 reconstructs two transport streams into one transport stream. However, in the example of FIG. 6, as a more general example, a plurality of transport streams are reconstructed into one transport stream.

In FIG. 6, transport streams TS1, TS2, . . . , and TSn are supplied to PID selecting circuits 51-1, 51-2, . . . , and 51-n. The PID selecting circuits 51-1, 51-2, . . . , and 51-n extract only the designated PID packets from the transport streams TS1, TS2, . . . , and TSn, respectively.

Besides the packets of the video/audio components, a packet of character data for the subtitles, PSI such as NIT, PAT, PMT, and the like, and the packet of the SI for services of the EIT for the EPG exist in the transport stream. The PID selecting circuits 51-1, 51-2, . . . , and 51-n execute processes for allowing only the designated PID to pass and removing the unnecessary information from those packets.

Since the actual CA system has been designed so as to handle the single transport stream, a processing speed for handling a plurality of transport streams is not so high. Therefore, the processes are enabled by reducing the information amount by a filter according to the PID.

If the processing speed of the CA system is sufficiently high, a plurality of transport streams can be reconstructed as one transport stream irrespective of the necessary/unnecessary information.

Figure 7:
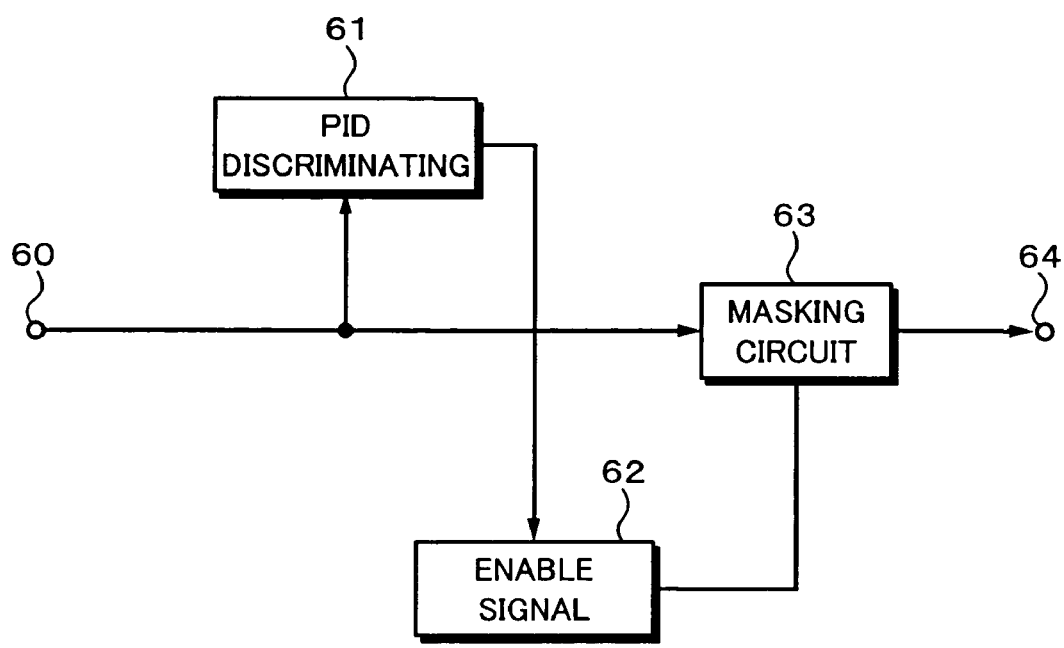
FIG. 7 is a block diagram of an example of a PID selecting circuit.

The PID selecting circuits 51-1, 51-2, . . . , and 51-n are constructed as shown in FIG. 7. In FIG. 7, the transport stream is supplied to an input terminal 60. The transport stream is outputted from an output terminal 64 through a masking circuit 63. When an enable signal is supplied from an enable signal setting circuit 62, the masking circuit 63 outputs the packet from the input terminal 60. When a disenable signal is supplied, the masking circuit 63 masks the packet from the input terminal 60.

The transport stream TS from the input terminal 60 is supplied to a PID discriminating circuit 61. In the PID discriminating circuit 61, whether the packet is a packet of the necessary information or a packet of the unnecessary information is discriminated from the transport stream TS. An output of the PID discriminating circuit 61 is supplied to the enable signal setting circuit 62.

When it is determined in the PID discriminating circuit 61 that it is the packet of the necessary information, the enable signal is outputted from the enable signal setting circuit 62. If it is determined that it is the packet of the unnecessary information, a display enable signal is outputted from the enable signal setting circuit 62. An output of the enable signal setting circuit 62 is supplied to the masking circuit 63. Thus, only the necessary packets in the transport stream from the input terminal 60 can be outputted from the output terminal 64.

In FIG. 6, outputs of the PID selecting circuits 51-1, 51-2, . . . , and 51-n are supplied to a sync & mixing circuit 52. The sync & mixing circuit 52 newly forms one transport stream from a plurality of transport streams.

An output of the sync & mixing circuit 52 is supplied to a CA system 53. The CA system 53 corresponds to the system comprising the descrambler & demultiplexer 18, IC card 20, and microprocessor 10.

Figure 8:
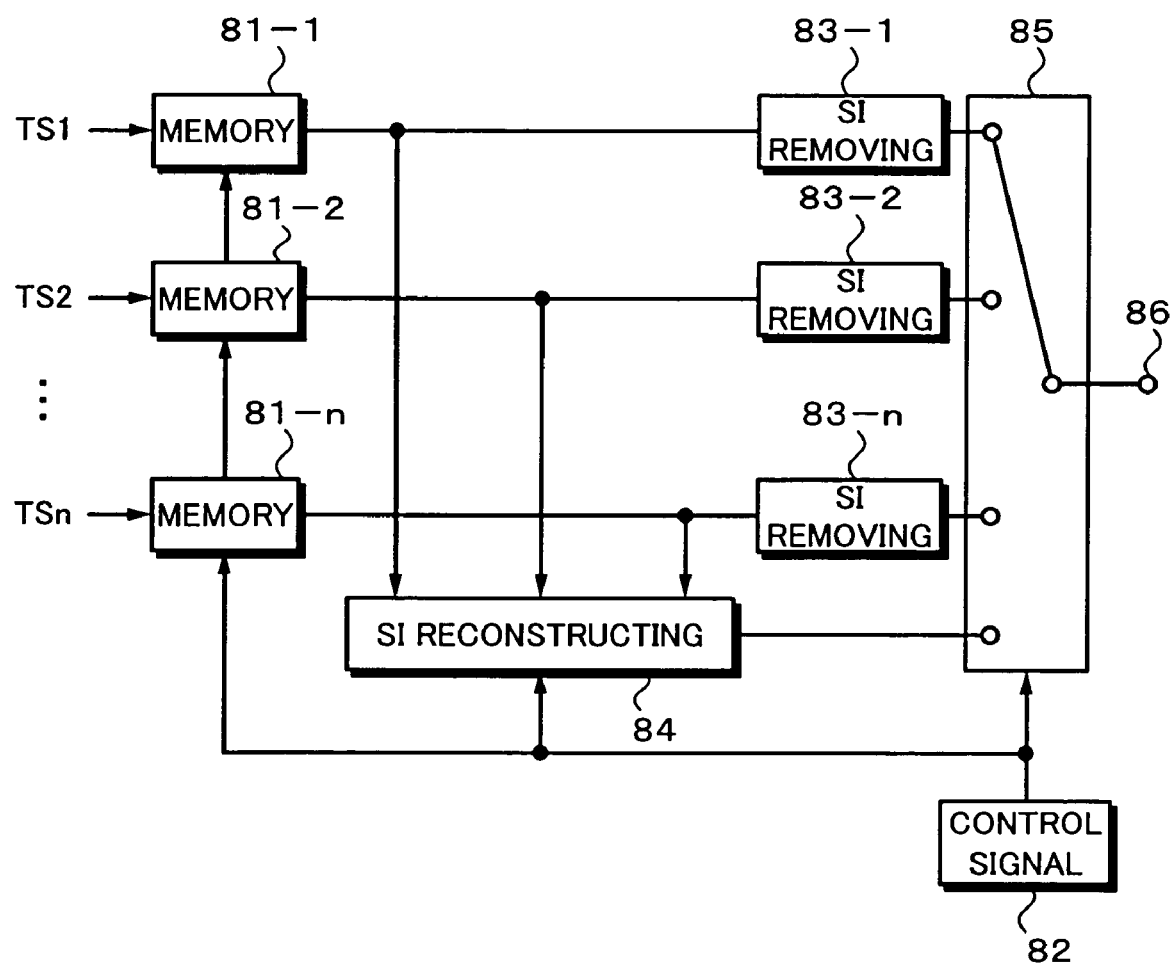
FIG. 8 is a block diagram of an example of a sync & mixing circuit.

The sync & mixing circuit 52 in FIG. 6 is constructed as shown in FIG. 8. In FIG. 8, the transport streams TS1, TS2, . . . , and TSn are supplied to memories 81-1, 81-2, . . . , and 81-n. The memories 81-1, 81-2, . . . , and 81-n are provided to synchronize each of the transport streams TS1, TS2, . . . , and TSn which are a synchronously inputted with the single transport stream. A timing signal is supplied from a control signal generating circuit 82 to the memories 81-1, 81-2, . . . , and 81-n.

Outputs of the memories 81-1, 81-2, . . . , and 81-n are supplied to SI removing circuits 83-1, 83-2, . . . , and 83-n and to an SI reconstructing circuit 84. The SI removing circuits 83-1, 83-2, . . . , and 83-n are provided to remove the packets of the SI of the transport streams TS1, TS2, . . . , and TSn. The SI reconstructing circuit 84 is provided to reconstruct the packet of the SI from the packets of the SI of the transport streams TS1, TS2, . . . , and TSn.

For example, there is a PAT as SI. Information peculiar to each carrier has been multiplexed into the PAT. That is, the program information in each transport stream and the PID of the PMT showing the contents of each program have been described in the PAT. Therefore, when one transport stream is reconstructed by synthesizing a plurality of transport streams, if the PAT is maintained as it is, the information of the different transport streams is included in the same stream and a collapse of the system occurs. Therefore, the packets of the PAT of the transport streams TS1, TS2, . . . , and TSn are removed by the SI removing circuits 83-1, 83-2, . . . , and 83-n. The PAT is reconstructed by the SI reconstructing circuit 84 so as not to cause contradiction in one transport stream.

Figure 9:
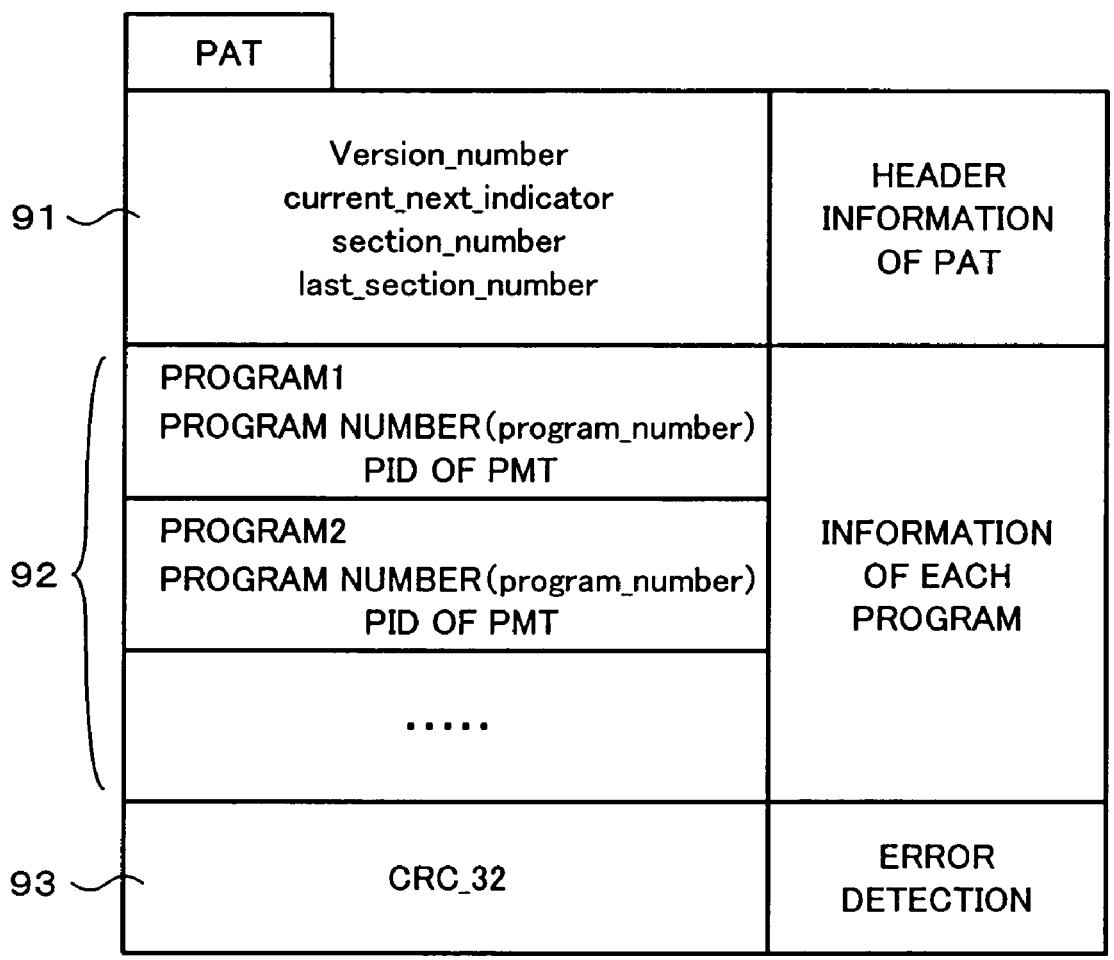
FIG. 9 is a schematic diagram showing a structure of a PAT.

The reconstruction of the PAT will be further described. FIG. 9 shows a construction of the PAT. As shown in FIG. 9, the PAT can be divided into three large portions. A first portion 91 is header information which is peculiar to the PAT. A second portion 92 is information of each program (PID of the PMT of each program). A third portion 93 is a portion 93 of a CRC (Cyclic Redundancy Check) for error detection.

In the step of reconstructing the SI, the newly formed information is described in the first header portion 91. The second portion of the information of each program is formed by being copied from the information of each transport stream. The third portion 93 of the CRC is formed by being newly calculated from the whole PAT.

That is, it is assumed that the transport stream TS1 (FIG. 10A) and the transport stream TS2 (FIG. 10B) were inputted as shown in FIG. 10. A packet P1a of the PAT which is necessary for making the CA system in the transport stream TS1 operative is received. Information regarding the program to be monitored in the transport stream TS1 is extracted from the packet P1a of the PAT. This information is copied into the PAT of a transport stream P1c (FIG. 10C) which is newly formed.

Since "version_number", "current_next_indicator", "section_number", and "last_section_number" in the PAT header (refer to FIG. 9) are determined by the operation of the CA system, recalculation is performed on the basis of an operation rule. Ordinarily, since "version_number" or "section_number" is increased one by one, in the case of obtaining the new PAT by the transport stream, SI information of the transport stream which is newly formed is formed. At the last stage of the above process, a section length of the newly formed PAT and the CRC are calculated, those information is added, and a packet P1c of the new PAT is formed.

Subsequently, a packet P1b of the PAT which is necessary for making the CA system in the transport stream TS2 operative is received. Information regarding the program to be monitored in the transport stream TS2 is extracted from the packet P1b of the PAT. This information is copied into the PAT of a transport stream P2c which is newly formed.

"version_number", "current_next_indicator", "section_number", and "last_section_number" in the PAT header are recalculated on the basis of the operation rule. Finally, a section length of the newly formed PAT and the CRC are calculated, those information is added, and a packet P2c of the new PAT is formed. The packets of the new PATs are reconstructed in a manner similar to the above.

Such processes are executed in the case where the new program information is obtained from the transport stream TS1 or TS2 and in the case where "version_number" or "section_number" is set to a new number.

Although information such as CAT, NIT, EIT, and the like other than the PAT is also needed for the MPEG2 system, since they are the information which is necessary for operating the digital broadcasting, the information necessary for operating the CA system needs to be reconstructed by a system similar to that of the PAT.

In FIG. 8, the packets of the SI of the PAT, CAT, NIT, EIT, and the like are removed by the SI removing circuits 83-1, 83-2, . . . , and 83-n as mentioned above. Outputs of the SI removing circuits 83-1, 83-2, . . . , and 83-n are supplied to a switching circuit 85. As mentioned above, the packets of the SI such as PAT, CAT, NIT, EIT, and the like are reconstructed by the SI reconstructing circuit 84. An output of the SI reconstructing circuit 84 is supplied to the switching circuit 85. Since the SI reconstructing circuit simply rearranges the PIDs which designate the information of the table defined by the MPEG2, it can be realized by either hardware or software.

The switching circuit 85 is switched by a timing signal from the control signal generating circuit 82. A plurality of transport streams TS1, TS2, . . . , and TSn are synthesized into one stream by the switching circuit 85. The SI reconstructed by the SI reconstructing circuit 84 is added to such a stream. The transport stream reconstructed as mentioned above is outputted from an output terminal 86.

In the example of FIG. 8, when a plurality of transport streams are reconstructed to one transport stream, the SI of a plurality of transport streams is reconstructed by the SI reconstructing circuit 84 so as not to cause a collapse in the system and added to the reconstructed stream. However, as shown in FIG. 11, it is also possible to obtain the information of the SI from a plurality of transport streams and send the obtained information of the SI of the transport streams to the microprocessor as it is.

That is, as shown in FIG. 5, ordinarily, the information of the SI is extracted by the demultiplexer in the descrambler & demultiplexer 18 and supplied to the microprocessor 10. In this instance, if the SI information is extracted by the preprocessing circuit 17 at the front stage of the descrambler & demultiplexer 18 and sent it to the microprocessor 10, there is no need to extract the SI packet by the descrambler & demultiplexer 18 and send to the microprocessor 10. In this case, there is no need to reconstruct the SI information and include it into the newly reconstructed transport stream by the preprocessing circuit 17.

Figure 11:
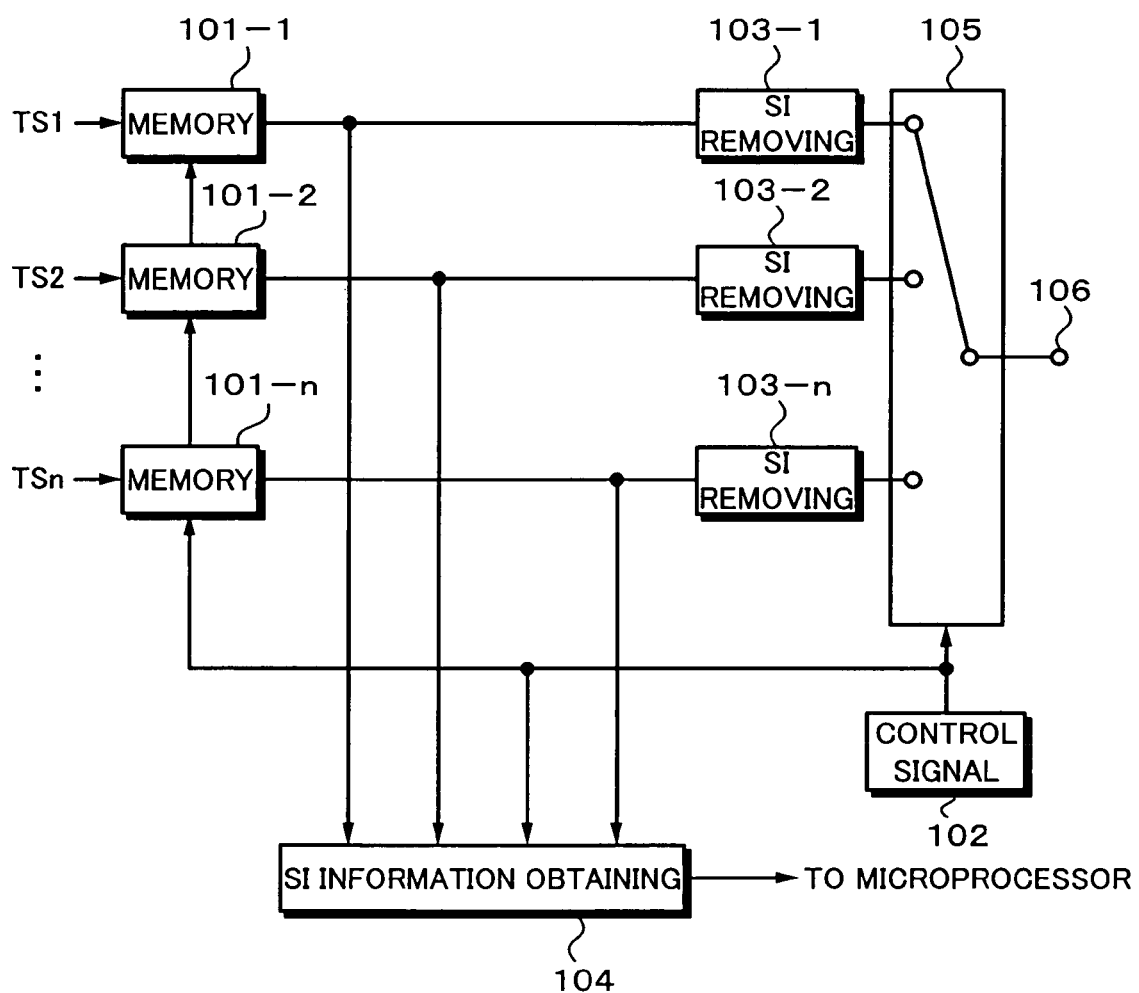
FIG. 11 is a block diagram of another example of the sync & mixing circuit.

In FIG. 11, a plurality of transport streams TS1, TS2, . . . , and TSn are supplied to memories 101-1, 101-2, . . . , and 101-n. The memories 101-1, 101-2, . . . , and 101-n are provided to synchronize each of the transport streams TS1, TS2, . . . , and TSn which are asynchronously inputted with the single transport stream. A timing signal is supplied from a control signal generating circuit 102 to the memories 101-1, 101-2, . . . , and 101-n.

Outputs of the memories 101-1, 101-2, . . . , and 101-n are supplied to SI removing circuits 103-1, 103-2, . . . , and 103-n and to an SI information obtaining circuit 104. The SI removing circuits 103-1, 103-2, . . . , and 103-n are provided to remove the packets of the SI of the transport streams TS1, TS2, . . . , and TSn. The SI information obtaining circuit 104 is provided to obtain the packet of the SI from the packets of the SI of the transport streams TS1, TS2, . . . , and TSn. The packet of the SI obtained by the SI information obtaining circuit 104 is supplied to a microprocessor (corresponding to the microprocessor 10 in FIG. 5).

Outputs of the SI removing circuits 103-1, 103-2, . . . , and 103-n are supplied to a switching circuit 105. The switching circuit 105 is switched by a timing signal from the control signal generating circuit 102. A plurality of transport streams TS1, TS2, . . . , and TSn are synthesized into one stream by the switching circuit 105. The transport stream reconstructed as mentioned above is outputted from an output terminal 106.

If the information of the SI is obtained from a plurality of transport streams and the obtained SI information of the transport streams is sent to the microprocessor as it is, there is no need to newly reconstruct the SI. However, software processes in the microprocessor become complicated.

Figure 12:
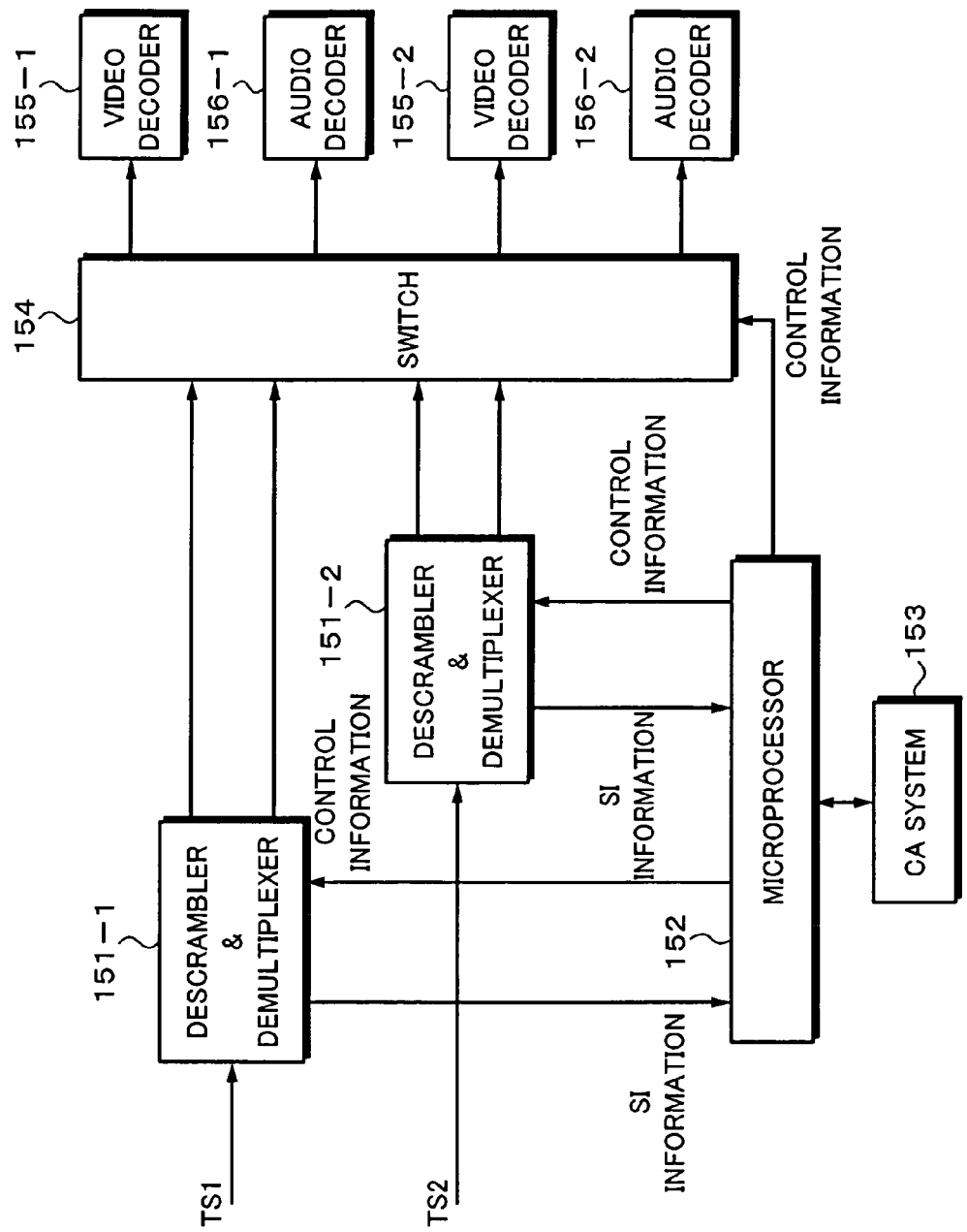
FIG. 12 is a block diagram of another embodiment of the invention.

FIG. 12 shows another embodiment of the invention. In this embodiment, the preprocessing circuit 17 and the descrambler & demultiplexer 18 in FIG. 5 are integrated.

In FIG. 12, the transport stream TS1 is supplied to a descrambler & demultiplexer 151-1 and the transport stream TS2 is supplied to a descrambler & demultiplexer 151-2.

The packet of the SI in the transport stream TS1 is extracted by the descrambler & demultiplexer 151-1 and this SI packet is supplied to a microprocessor 152. The packet of the SI in the transport stream TS2 is extracted by the descrambler & demultiplexer 151-2 and this SI packet is supplied to the microprocessor 152.

A CA system 153 is provided for the microprocessor 152. The CA system 153 is used in common in the limited reception for the transport stream TS1 and the limited reception for the transport stream TS2.

The microprocessor 152 executes a limited receiving process for the transport stream TS1 and a limited receiving process for the transport stream TS2 in parallel.

The SI for the process of the transport stream TS1 is sent from the descrambler & demultiplexer 151-1 to the microprocessor 152. Control information corresponding to the transmitted SI is returned from the microprocessor 152.

The SI for the process of the transport stream TS2 is sent from the descrambler & demultiplexer 151-2 to the microprocessor 152. Control information corresponding to the transmitted SI is returned from the microprocessor 152.

A video packet and an audio packet of a desired program are separated from the transport stream TS1 by the descrambler & demultiplexer 151-1. Outputs of the descrambler & demultiplexer 151-1 are supplied to a switching circuit 154.

A video packet and an audio packet of a desired program are separated from the transport stream TS2 by the descrambler & demultiplexer 151-2. Outputs of the descrambler & demultiplexer 151-2 are supplied to the switching circuit 154. A control signal is supplied to the switching circuit 154 from the microprocessor 152. Outputs of the switching circuit 154 are supplied to a video decoder 155-1, an audio decoder 156-1, a video decoder 155-2, and an audio decoder 156-2.

The switching circuit 154 switches the outputs of the descramblers & demultiplexers 151-1 and 151-2 in accordance with the decoder on the output destination side.

As mentioned above, in the example shown in FIG. 12, the preprocessing circuit and the descrambler & demultiplexer are integrated. In this example, however, since the preprocessing circuit and the descrambler & demultiplexer are integrated, two systems of the descrambler & demultiplexer are needed. In an example of FIG. 13, by time-divisionally using the descrambler & demultiplexer, the processes can be executed by one descrambler & demultiplexer.

Figure 13:
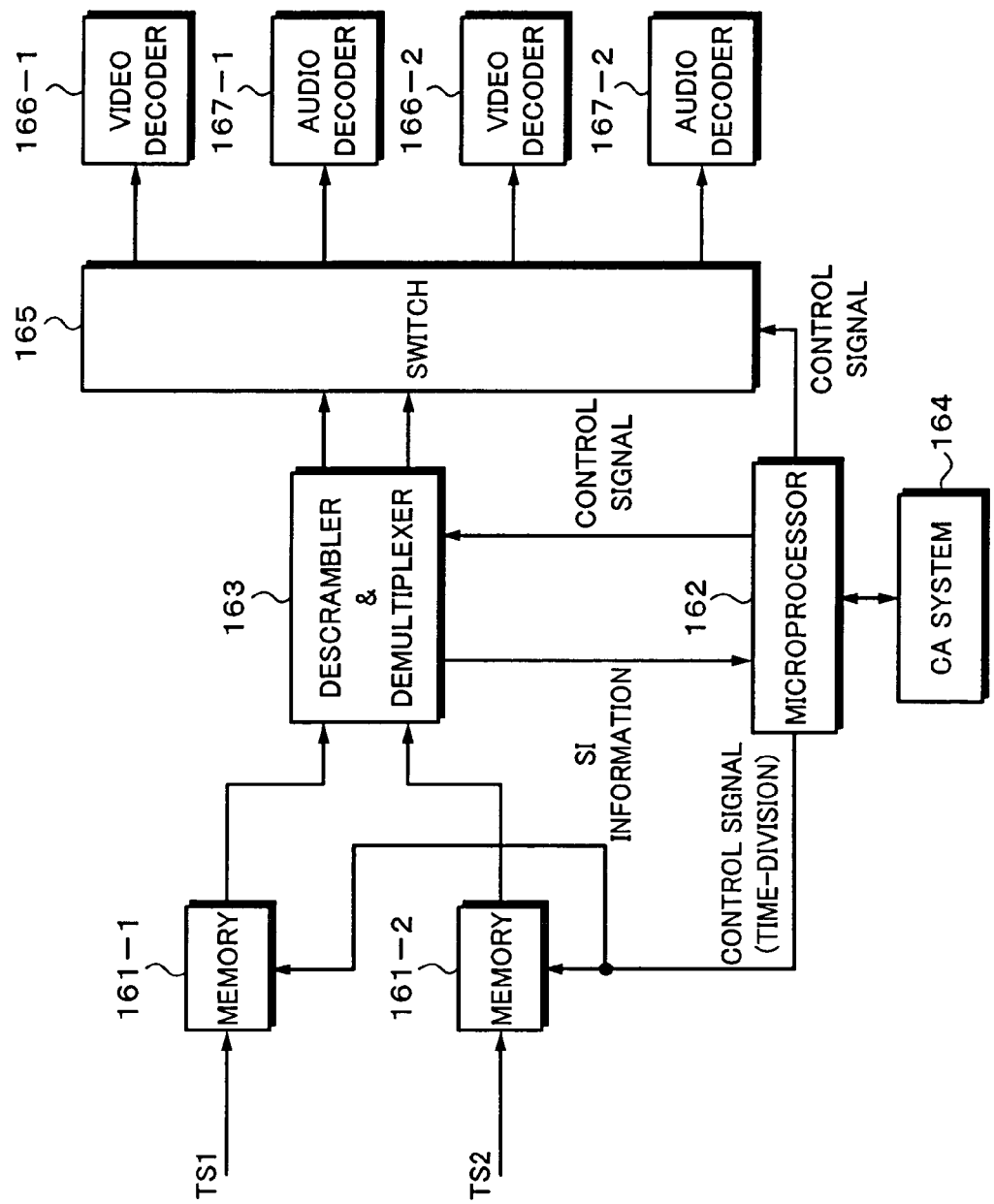
FIG. 13 is a block diagram of further another embodiment of the invention.

In FIG. 13, the transport stream TS1 is supplied to a memory 161-1 and the transport stream TS2 is supplied to a memory 161-2. A control signal is supplied to the memories 161-1 and 161-2 from a microprocessor 162. The stream from the memory 161-1 and the stream from the memory 161-2 are alternately switched by the control signal from the microprocessor 162. A CA system 164 is provided for the microprocessor 162. The CA system 153 is used in common in the limited reception for the transport stream TS1 and the limited reception for the transport stream TS2.

First, the transport stream TS1 is outputted from the memory 161-1 and this transport stream TS1 is supplied to a descrambler & demultiplexer 163.

The packet of the SI in the transport stream TS1 is extracted by the descrambler & demultiplexer 163 and this SI packet is supplied to the microprocessor 162. Control information corresponding to the SI packet is returned from the microprocessor 162. Thus, the control of the limited reception of the transport stream TS1 is made. A video packet and an audio packet of the program of the transport stream TS1 are outputted from the descrambler & demultiplexer 163.

Subsequently, the transport stream TS2 is outputted from the memory 161-2 and this transport stream TS2 is supplied to the descrambler & demultiplexer 163.

The packet of the SI in the transport stream TS2 is extracted by the descrambler & demultiplexer 163 and this SI packet is supplied to the microprocessor 162. Control information corresponding to the SI packet is returned from the microprocessor 162. Thus, the control of the limited reception of the transport stream TS2 is made. A video packet and an audio packet of the program of the transport stream TS2 are outputted from the descrambler & demultiplexer 163.

Outputs of the descrambler & demultiplexer 163 are supplied to a switching circuit 165. The control signal is supplied to the switching circuit 165 from the microprocessor 162. Outputs of the switching circuit 154 are supplied to a video decoder 166-1, an audio decoder 167-1, a video decoder 166-2, and an audio decoder 167-2.

The switching circuit 154 switches outputs of the descrambler & demultiplexer 163 in accordance with the decoder on the output destination side.

As mentioned above, in the example shown in FIG. 13, the descrambler & demultiplexer 163 is time-divisionally used. Therefore, the processes can be executed by one descrambler & demultiplexer 163.

As described above, according to the invention, a plurality of transport streams can be processed by one CA system and, at the same time, a plurality of programs can be reproduced. Therefore, what is called back program recording, multi-screen reproduction, PinP reproduction, or the like can be executed.

By applying the present invention, the invention can be also used as a preprocess of the format conversion from the transport streams into a program stream serving as a format of a digital recording apparatus.

DESCRIPTION OF REFERENCE NUMERALS

17 PREPROCESSING CIRCUIT
51-1, 51-2, . . . , 51-$n$ SELECTING CIRCUIT
52 SYNC & MIXING CIRCUIT
53 CA SYSTEM
61 PID DISCRIMINATING CIRCUIT
62 ENABLE SIGNAL SETTING CIRCUIT
63 MASKING CIRCUIT

The invention claimed is:

1. A data processing apparatus, comprising:
    means for extracting a packet necessary for monitoring from each of a plurality of transport streams that correspond to a plurality of concurrent programs, and for reconstructing the extracted packets to one transport stream;
    means for descrambling plural packets from the reconstructed one transport stream using a conditional access module and for separating the packets necessary for monitoring; and means for decoding each packet separated from the reconstructed one transport stream so that more than one of the plurality of concurrent programs is reproduced;

wherein the conditional access module has information needed to descramble the packets from the plurality of transport streams that are in the reconstructed one transport stream, and the means for extracting extracts packets of SI (Service Information) from each of the plurality of transport streams, reconstructs the extracted packets of SI as new SI packets, and adds the new SI packets to the reconstructed one transport stream.

2. A data processing apparatus according to claim 1, wherein the information of the packet of the SI obtained from each of said plurality of transport streams is sent to processing means, and a process for limited reception is executed.

3. A data processing apparatus, comprising:

means for extracting information of a packet of SI (Service Information) from each of a plurality of transport streams that correspond to a plurality of concurrent programs, and for descrambling plural packets using the information of the packet of the SI obtained from each of said plurality of transport streams and a conditional access module;

means for the common descrambling with respect to each of said plurality of transport streams and for separating the packets necessary for monitoring; and means for decoding each packet separated from each of said transport streams so that more than one of the plurality of concurrent programs is reproduced;

wherein the conditional access module has information needed to descramble the packets from the plurality of transport streams and descrambles the packets using such information and the information of the packet of SI extracted each of the plurality of transport streams that correspond to the plurality of concurrent programs.

4. A data processing apparatus according to claim 3, wherein said means for separating the packets necessary for monitoring is time-divisionally used with respect to said plurality of transport streams.

5. A data processing apparatus according to claim 3, wherein the information of the packet of the SI obtained from each of said plurality of transport streams is sent to processing means, and a process for limited reception is executed.

6. A digital broadcasting receiver, comprising:

means for extracting a packet necessary for monitoring from each of a plurality of transport streams that correspond to a plurality of concurrent programs, and for reconstructing the extracted packets to one transport stream;

means for descrambling plural packets from the reconstructed one transport stream using a conditional access module and for separating the packets necessary for monitoring; and means for decoding each packet separated from the reconstructed one transport stream so that more than one of the plurality of concurrent programs is reproduced;

wherein the conditional access module has information needed to descramble the packets from the plurality of transport streams that are in the reconstructed one transport stream, and the means for extracting extracts packets of SI (Service Information) from each of the plurality of transport streams, reconstructs the extracted packets of SI as new SI packets, and adds the new SI packets to the reconstructed one transport stream.

7. A data processing method, comprising:

extracting a packet necessary for monitoring from each of a plurality of transport streams that correspond to a plurality of concurrent programs;

reconstructing the extracted packets to one transport stream;

descrambling plural packets from said reconstructed one transport stream using a conditional access module and separating the packets necessary for monitoring; and decoding each packet separated from said reconstructed one transport stream so that more than one of the plurality of concurrent programs is reproduced;

wherein the conditional access module has information needed to descramble the packets from the plurality of transport streams that are in the reconstructed one transport stream, the extracting step includes extracting packets of SI (Service Information) from each of the plurality of transport streams, and the reconstructing includes:
reconstructing the extracted packets of SI as new SI packets, and
adding the new SI packets to the reconstructed one transport stream.

8. A data processing method according to claim 7, wherein the information of the packet of the SI obtained from each of said plurality of transport streams is sent to processing means, and a process for limited reception is executed.

9. A data processing method, comprising:

extracting packet information of SI (Service Information) from each of a plurality of transport streams that correspond to a plurality of concurrent programs, and descrambling plural packets using the information of the packet of the SI obtained from each of said plurality of transport streams and a conditional access module;

descrambling with respect to each of said plurality of transport streams and separating the packets necessary for monitoring; and decoding each packet separated from each of said transport streams, respectively, so that more than one of the plurality of concurrent programs is reproduced;

wherein the conditional access module has information needed to descramble the packets from the plurality of transport streams and descrambles the packets using such information and the information of the packet of SI extracted each of the plurality of transport streams that correspond to the plurality of concurrent programs.

10. A data processing method according to claim 9, wherein said means for separating the packets necessary for monitoring is time-divisionally used with respect to said plurality of transport streams.

11. A data processing method according to claim 9, wherein the information of the packet of the SI obtained from each of said plurality of transport streams is sent to processing means, and a process for limited reception is executed.

* * * * *